United States Patent [19]
Centofanti et al.

[11] Patent Number: 6,103,823
[45] Date of Patent: Aug. 15, 2000

[54] THREE STAGES PROCESS FOR THE PREPARATION OF SOLID THERMOPLASTIC COMPOSITIONS BASED ON POLYVINYL ALCOHOL AND MOLDABLE AND EXTRUDABLE COMPOSITIONS OBTAINED ACCORDINGLY

[75] Inventors: Adriano Centofanti, Lavezzola; Gianfranco Centofanti, San Biagio di Argenta, both of Italy

[73] Assignee: Panteco S.R.L., Ferrara, Italy

[21] Appl. No.: 09/025,205

[22] Filed: Feb. 18, 1998

[30] Foreign Application Priority Data

Feb. 25, 1997 [IT] Italy ................................. MI97A0401

[51] Int. Cl.$^7$ ............................. C08F 16/06; C08L 29/04
[52] U.S. Cl. ................... 525/60; 525/61; 525/56; 525/57; 524/557; 264/185
[58] Field of Search ................... 525/60, 61, 56, 525/57; 524/557; 264/185

[56] References Cited

U.S. PATENT DOCUMENTS

| | | | |
|---|---|---|---|
| 3,997,489 | 12/1976 | Coker | 525/57 |
| 4,323,492 | 4/1982 | Zimmermann et al. | 525/57 |
| 4,469,837 | 9/1984 | Cattaneo | 525/57 |

FOREIGN PATENT DOCUMENTS

| | | |
|---|---|---|
| 0635545 | 1/1995 | European Pat. Off. . |
| 1077351 | 7/1967 | United Kingdom . |
| 9309171 | 5/1993 | WIPO . |

OTHER PUBLICATIONS

European Search Report, The Hague, Jun. 12, 1998, Examiner: De Los Arcos, E.
Chemical Abstracts, vol. 100, No. 2, Jan. 9, 1984, abstract No. 7796.
Chemical Abstracts, vol. 121, No. 14, Oct. 3, 1994, abstract No. 158893.
Database WPI, Section CH, Week 7430, Jan. 11, 1974, Derwent Publications Ltd., London, GB; Class A14, AN 74–54354V.

*Primary Examiner*—James J. Seidleck
*Assistant Examiner*—Olga Asinovsky
*Attorney, Agent, or Firm*—Hedman, Gibson & Costigan, P.C.

[57] ABSTRACT

A three stages process for the preparation of solid thermoplastic compositions based on polyvinyl alcohol comprising the mixing in a mixer of a first charge, comprising the polyvinyl alcohol and solid plasticizers, with a second charge constituted by one or more hydroxylated organic compounds selected from glycols, glycol ethers and alkanolamines and at least a salt of an alkaline and/or alkaline earth metal, and a third charge containing at least one or more solid polyhydroxylated alcohols, glycols and glycolic ethers, liquid alkanolamines, organic or inorganic mineral acids, hydrated inorganic salts, polymers having a low molecular weight, stabilizers and possible mineral charges, is described.

11 Claims, No Drawings

THREE STAGES PROCESS FOR THE PREPARATION OF SOLID THERMOPLASTIC COMPOSITIONS BASED ON POLYVINYL ALCOHOL AND MOLDABLE AND EXTRUDABLE COMPOSITIONS OBTAINED ACCORDINGLY

A. FIELD OF THE INVENTION

The present invention refers to a three stages process for the preparation of solid thermoplastic compositions based on polyvinyl alcohol (PVOH) and to the so obtained compositions, which are moldable and extrudable, namely suitable to be submitted as themselves to the common methods of hot forming of the more common thermoplastic materials such as polyethylene (PE), polypropylene (PP), polyvinyl chloride (PVC).

The compositions according to the present invention are particularly useful for the preparation of envelopes (bags or other kind of containers) for the throwaway package of the most different products. In fact the compositions according to the invention are totally soluble in water and biodegradable and owing to this the used package may be easily eliminated after the use without ecological problems.

The films obtained with the compositions of the present invention are particularly useful in the agricultural field, to pack for example anticryptogamics other products which must be vehiculated in aqueous means as they allow directly dissolving in water the packed product without eliminating the package; in the textile field, for the packaging of textile manufactures; in the hospital-field, for the collection of linen which must be submitted to washing and sterilization; in the paper factories, for the packaging of paper sanitary products.

B. PRIOR ART

The polyvinyl alcohols (PVOH) available on the market as raw material are the result of a process of acid or basic hydrolysis of polyvinyl acetate during which the original acetyl groups are substituted, in a minor or major extent, by the hydroxy alcoholic groups.

So the structure of the PVOH may be represented by the following formula:

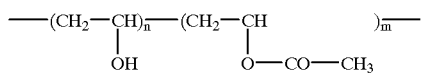

wherein the n alcoholic groups and the m acetyl groups follow each other singularly or in groups in the molecule.

The hydrolysis degree of the PVOH is expressed by the ratio $100n/(n+m)$. The greater the value of the n/m ratio, the better the mechanical and chemico-physical characteristics in terms of toughness and resistance and impermeability to common gases, vapours and apolar organic liquids.

In fact it is known that one of the characteristics of the PVOH is its easy solubility in water which however turns out to be reduced for n/m values greater than 95/5.

The solubility in water of the PVOH may be limited also with suitable thermal treatments in presence of cross-linking agents.

The commercial PVOH is a rough powder form which may contain up to 5% of water.

It is possible to have commercially available products having a different degree of polymerization identifiable by the viscosity measure of a 4% aqueous solution carried out at 20° C.

One of the greatest difficulties met by the transformers is the practical impossibility to obtain extruded or directly molded from articles of manufacture PVOH, by using the common transformation machines used for PE, PP or PVC. In fact, at the working temperatures (160° C.-250° C.), according to the hydrolysis degree of the PVOH, degradation and uncontrolled cross-linking phenomena show up with formation of clots and development of acid vapours originated by the decomposition of the residual acetyl groups.

Thus it has been considered essential to incorporate in the PVOH an aqueous or hydroxy kind plasticizer in order to obtain its transformability in to quality articles of manufacture avoiding said phenomena.

In order to obtain the compounding in the PVOH of the water and of the needed plasticizers, a method has been set up which provides for the solubilization in water of PVOH and the deposit of the solution on heated tapes or rollers in order to evaporate the water, thus obtaining a film of pure PVOH or possibly plasticized by glycerine and glycols previously co-solubilized by the PVOH.

Another process is based on the inbibition of the PVOH powders with a concentration up to 50% of water and liquid plasticizers (glycols and glycerine) followed by working the product in transforming machines endowed with "vent" for the removal of the aqueous excess.

The U.S. Pat. No. 4,469,837 describes a process which is substantially based on the dry mixing of PVOH powders with 15–50% of polyhydroxylated solid alcohols having a melting point ranging from 160° C. to 230° C. with the possible addition of poor percentages of other alcohols or liquid hydroxylated products in order that the melting point of the mixtures is within the above mentioned range of temperatures.

Lubricants, mineral charges, metallic oxides or other compatible polymers may be added to the described mixture.

Though the latter process points out, with respect to the known techniques, the clear advantage to avoid dissolutions in water or inbibitions with PVOH liquid plasticizers, and the transformation in manufactures is allowed in the equipments used for the most common plastics, several limitations which notably hinder the practical usefulness remain.

C. TECHNICAL PROBLEM

The compositions, obtained by cold homogenizing in mechanical blade mixers, are not immediately usable in the transformation equipments but they need more or less prolonged stocking times in a humid environment in order to absorb the optimal aqueous amount.

The transformation equipments must be provided with gases or vapours removal devices such as, for example, heating systems of the feeder hoppers and/or vent suitably placed along the cylinder of the machine.

The obtained articles of manufacture, moreover, are, homogeneous and transparent but provided with a great stiffness which makes them extremely fragile.

Only after a more or less long conditioning period in a humid environment and the reaching of the hygrometric equilibrium, with the absorption of great amounts of water, the manufactures show an improvement in flexibility.

The appearing difficulties are intuible, for example, in the coil winding phase of a PVOH plastic film and the difficulties related to the necessity of prolonged stockings of the various materials during the seasoning phases.

Finally, despite the adoption of accurate precautions, the described process does not allow to achieve the workability constancy throughout the time, which is desirable for any industrial application.

D. DETAILED DESCRIPTION OF THE INVENTION

Now it has been found that it is possible to obtain moldable and extrudable polyvinyl alcohol (PVOH) based thermoplastic solid compositions, having a good plasticization of the PVOH in the transformation equipments and an excellent workability constancy in time and transformable in manufactures provided with good flexibility, if the PVOH, polyhydroxylated plasticizers and the other additives mixtures are prepared in a mixer with a process comprising the three subsequent phases.

The process according to the invention is characterized in that the mixer is fed in sequence, without discontinuity moments in its mixing action, with the following charges:

a) a solid charge comprising the polyvinyl alcohol (PVOH) and from 1 to 10 parts by weight of one or more solid plasticizers per 100 parts of PVOH;

b) a charge constituted of between 5 and 30 parts by weight with respect to 100 parts of PVOH of the charge a), of a liquid mixture containing one or more hydroxylated organic compounds, water and at least a salt of an alkaline and/or alkaline earth metal taking the temperature of the mixture to a value ranging from 90° C. to 125° C.;

c) a charge constituted of between 15 and 30 parts by weight with respect to 100 parts of PVOH of the charge a), of a solid mixture containing solid polyhydroxylated alcohols, glycols and glycolic ethers, liquid alkanolamines, mineral or organic acids, hydrated inorganic salts, low molecular weight polymers or copolymers, stabilizers, possible mineral charges and mixing for a time ranging from 10 to 60 seconds before unloading the composition in solid granular powder shape, which is subsequently cooled.

The solid plasticizers useful for the charge a) of the process according to the invention are glycols, polyethyleneglycols and aliphatic amides. Neopentyl glycol, 2-methyl-2-propyl-1,3-propandiol, trimethylolpropane, polyethyleneglycol (MW 1000–10000), glycerol monostearate, erucic, oleic and palmitic amides are particularly useful.

The hydroxylated compounds useful for the charge b) are glycols, glycolic ethers and alkanolamines. Glycerol (anhydrous or hydrated), ethyleneglycols, propyleneglycols (1,2-propandiol, 1,3-propandiol), diethyleneglycol, dipropyleneglycol, trimethyleneglycol, triethyleneglycol, tetraethyleneglycol, 1,2-hexanediol, 1,2,3-hexanetriol, 1,2, 6-hexanetriol, 3-methyl-1,3,5-pentatriol, diethanolamine, triethanolamine and tributanolamine are particularly useful.

The hydrated salts of alkaline or alkaline earth metals, used in mixture with the above listed liquid polyhydroxylated compounds, may be selected from the lithium, sodium, potassium, calcium and magnesium chlorides.

Either the charge b) and the charge c) are previously prepared mixing their components, before inserting them into the mixer.

Among the polyhydroxylated alcohols of the charge c), pentaerythritol, mannitol, trimethylolethane and inositol turned out particularly useful.

The glycols, the glycolic ethers and the alkanolamines used in the phase c) in mixture with the polyhydroxylated solid alcohols and with other additives are selected from the list of the products used in the phase b).

Al-trihydroxyheptahydrate, hydrated Na, Al-silicate (sodium zeolite), hydrated Mg, Al basic carbonate (synthetic hydrotalcite) are among the particularly advantageous hydrated salts.

Adipic acid, citric acid, salicylic acid, acetylsalicylic acid, ascorbic acid, boric acid, stannic acid are particularly useful among the organic and inorganic acids usable for the preparation of the charge c).

Among the polymers or copolymers having low molecular weight, polyvinylacetate and the copolymer ethylenevinylacetate are particularly useful. Polyvinylacetate has preferably low density.

Among the stabilizers used in the Examples, the IRGANOX® B225 are constituted by mixtures formed by 50% by weight of a polyfunctional phenolic compound having high molecular weight IRGANOX® 1010 and by 50% of an organic phosphite IRGAFOS® 168 and they are commonly used in the stabilization of the polyolefins. The denominations IRGANOX and IRGAFOS are trademarks by the Ciba Geigy society.

The more commonly used mineral charges may be selected from calcium carbonate, talc, mica, silica.

In the preferred realization forms of the process according to the invention, the charge a) is constituted by 100 parts of PVOH, 1–10 parts of one or more solid plasticizers. Examples of solid plasticizers are polyethyleneglycols having MW 1,000–10,000 (preferably 0.1–5 parts), aliphatic amides, glyceryl monostearate (preferably up to 1 part).

In the preferred realization forms of the process according to the invention the charge b) is constituted by a liquid mixture containing 30–70% by the whole weight of the charge of a liquid glycol and/or of a glycolic ether, 10–25% of water; 5–20% of an alkanolamine, up to 20% of a trihydroxylated alcohol and 5–15% of a salt of an alkaline or alkaline earth metal and the charge c) is formed by a solid mixture containing 85–95% of a solid polyhydroxylic aliphatic alcohol, 4–10% of a liquid glycol or glycolic ether, 0.5–2% of an alkanolamine, 0.3–2.0% of an inorganic or organic acid, 0.1–7% of an hydrated inorganic salt, up to 1.5 parts of a mineral charge, 0.2–0.7% of a stabilizer, and up to 4% of a polymer or copolymer having low molecular weight.

The obtained composition is directly transformed in a manufacture by the commonly used equipments for the production of granulates, flat or tubular films, molded articles of manufacture, plates or films coextruded with polyolefins, polyvinyl chloride, polystyrene or polyamides.

According to a preferred form of realization of the invention, the granular solid powder obtained by the described process is granulated before the transformation in the finished products.

The equipments for the transformation of the compositions obtained by the process according to the invention consist substantially in a feeder hopper, in a cylindrical body equipped with one or two screws for the plasticization and the progress of the melted material, in a head suitably arranged for the production of different kinds of manufactures and finally in a cooling system excluding the direct contact of the PVOH with water in consideration of the high sensitivity of the polymer to it.

The possible transformation in granulates happens using preferably a twin-screw drawplate.

Unlike what expected in the known technique, the transformation equipments of the compositions of the invention in working manufactures do not need devices for the removal of gases or vapours.

In the same way, periods of seasoning in humid environments are not necessary for the powders and the manufactures obtained from them.

The transformation temperatures range from 170° C. to 250° C. in function either of the PVOH hydrolysis degree and of the amounts and kind of the added additives.

EXAMPLE 1

100 parts of a PVOH powder having an hydrolysis degree equal to 88% molar, viscosity equal to 13 and melting point about 187° C. are introduced in a mixer having a capacity equal to 500 l and rotation velocity equal to 700 rpm, together with 2 parts of 2-methyl-2-propyl-1,3-propandiol and 0.5 parts of erucamide.

The mixer is operated and then 20 parts of a mixture formed by 35% of propyleneglycol, 25% of triethyleneglycol, 12% of water, 9% of diethanolamine, 13% of glycerol and 6% of LiCl are fed to it and the mixing is protracted to the reaching of an inner temperature equal to 100° C.

Finally, 20 parts of an homogeneous mixture previously prepared in the same equipment and formed by 90% of pentaerythritol, 7% of triethyleneglycol, 1% of diethanolamine, 1% of boric acid, 0.4% of Irganox® B 225, 0.4% of sodium zeolite and 0.3% of aluminum trioxide heptahydrated are added and it is homogenized for about 20 s.

The so obtained PVOH based thermoplastic composition, which appears as a rough, dry and white colored powder is immediately fed, through the charging hopper, in an injection press equipped with the screw plasticization zone, and the pressing of plates having a thickness equal to 1.5 mm which result homogeneous, transparent and not fragile is carried out at 210° C.–220° C.

The same composition is fed in the hopper of a flat filming machine equipped with a screw having a diameter equal to 50 mm and with L/D equal to 30, able to produce a film having a thickness equal to 20 micrometers.

The recorded temperatures on the machine were respectively:

Feeding zone 200° C., compression zone 210° C., metering zone 205° C. and filming zone 190° C.

The film, submitted to determination of the mechanical characteristics in the temperature range 20–40° C. and with relative humidity variable between 40 and 80% gave the following results:

| Property | Measurement Method | Unit of measurement | Values with U.R. 40%–80% |
|---|---|---|---|
| Charge of Rupture in traction | ISO 527 50 mm/min | N/mm$^2$ | 25–80 |
| Extensibility to Rupture | ISO 527 | % | 100–300 |
| 10% Secant modulus (traction rigidity) | ISO 527 | N/mm$^2$ | 30–120 |

EXAMPLE 2

In the same equipment described in the former Example, 100 parts of PVOH, having the same characteristics already seen previously, 3 parts of trimethylolpropane, and 1 part of glyceryl monostearate are fed.

The mixer is operated and 22 parts of a mixture formed by 30% of 1,2-propandiol, 25% of dipropyleneglycol, 10% of triethanolamine, 13% of glycerol, 8% of magnesium chloride hexahydrated and 14% water are immediately added protracting the mixing until the inner temperature is equal to 100° C. 20 parts of an homogeneous mixture, previously prepared in the same equipment and comprising 90% of mannitol, 7% of dipropyleneglycol, 1% of triethanolamine, 1% of adipic acid, 0.5% of Irganox® B 225, 0.5% of sodium zeolite (hydrated sodium and aluminum silicate), are finally added mixing the whole for about 20 s.

The so prepared PVOH based composition, which turns up as a rough powder, is immediately fed in the hopper of a single-screw extruder (screw diam. 50 mm, L/D=30) with temperatures in the feeding, compression, metering zones and in the head, respectively equal to 200° C., 215° C., 210° C. and 195° C. with the head provided with a filming lip for the production of a flat film having a thickness equal to 20 micrometers.

The film, has been cooled by a compressed air flux and by the use of rollers with an inner water circulation at 15° C.

Submitted to the tests of gas permeability (oxygen, carbon dioxide and sulphur dioxide) at 22° C. and with a relative humidity equal to 6%, it has showed a permeability enormously lower with respect to that of the polyolefinic films of the same thickness, taken as reference.

The determination of the mechanical characteristics, carried out at 22° C. with a relative humidity ranging from 50% to 85%, has given the following results:

| Property | Measurement Method | Unit of measurement | Values with U.R. 50%–85% |
|---|---|---|---|
| Charge of Rupture in traction | ISO 527 50 mm/min | N/mm$^2$ | 40–70 |
| Extensibility to Rupture | ISO 527 | % | 100–300 |
| 10% Secant modulus (traction rigidity) | ISO 527 | N/mm$^2$ | 50–100 |

EXAMPLE 3

100 parts of PVOH powder (hydrolysis degree equal to 98% molar, viscosity equal to 20), 3 parts of 2-methyl-2-propyl-1,3-propandiol, 1 part of polyethyleneglycol MW equal to 5000, 1 part of erucic amide are introduced into the mixer described in the Example 1 and the machine is started.

18 parts of a mixture formed by 30% of 1,3-propandiol, 25% of diethyleneglycol, 10% of diethanolamine, 10% of glycerol, 7% of calcium chloride hexahydrated and 18% water, are then fed, homogenizing till obtaining an inner temperature equal to 100° C.

The composition is completed by adding 25 parts of an homogeneous mixture, formerly prepared in the same equipment, formed by the 86.5% of trimethylolethane, 10% of dipropyleneglycol, 1.5% of diethanolamine, 1% of salicylic acid, 0.5% of Irqanox B 225, 0.5% of synthetic hydrotalcite (hydrated magnesium and aluminum carbonate).

The so obtained PVOH based composition, which turns up as a rough powder formed by particles having maximum size equal to 1 mm, is fed in the hopper of a single screw extruder having a screw diameter equal to 50 mm and L/D=30 and equipped with a tubular filming head for the coextrusion together with PE (d=0.92, MFI=0.4). The external layers of the three layer film are formed by PE having a thickness equal to 80 micrometers, while the intermediate one is formed by the PVOH composition having a thickness equal to 60 micrometers.

The temperatures taken in the different zones of the extruder were: feeding zone 200° C., compression zone 215° C., metering zone 210° C. and filming zone 195° C.

The coextruded film, submitted to the test for the determination of the gas permeability, shows values of about $1/1000$ with respect to the polyethylene monofilm one, having similar thickness.

EXAMPLE 4

100 parts of PVOH powder (hydrolysis degree equal to 89% molar, and viscosity equal to 15), 2 parts of neopentylglycol, 1 part of trimethylpropane and 0.5 parts of glyceryl monostearate are introduced into the mixer described in the Example 1 and the homogenization is started.

20 parts of a mixture formed by 33% of ethyleneglycol, 22% of dipropyleneglycol, 10% of triethanolamine, 13% of glycerol, 6% of LiCl and 16% water, are immediately added, mixing at about 700 rpm till reaching an inner temperature of about 100° C.

Finally 26 parts of an homogeneous mixture formed by 70% of pentaerythritol, 5.5% of dipropyleneglycol, 0.6% of triethanolamine, 0.3% of boric acid, 0.3% of Irganox® B 225, 0.15% of sodium zeolite, 0.15% of anhydrous silica and 23% of ethylene-vinylacetate copolymer (vinyl acetate 35%) are fed and the composition is mixed for 30 s.

The content of the mixer, having the appearance of a white coloured rough powder, is fed in the single-screw extruder hopper (screw diameter=50 mm, L/D=30) equipped with a filming head for flat film production.

The thermal profile of the extruder provides for 200° C. in the feeding zone, 215° C. in the compression zone and 210° C. in the metering zone and 195° C. in the filming head. From the thus obtained film having a thickness of 80 micrometers, suitably cooled by an air laminar flux and the contact with the surface of cylinders having an inner water circulation at 15° C., a strip having width equal to 1 cm is obtained by suitable cutter. The strip is then submitted to longitudinal stretching with a ratio 8:1 in a Leonard equipment commonly used for the production of polypropylenic raffias.

The obtained filaments, having thickness equal to 55 microns, show at the dynamometer a charge of rupture equal to 93 N/mm² at 22° C. and with a relative humidity equal to 40%.

EXAMPLE 5

100 parts of PVOH powder having a hydrolysis degree equal to 92% molar, viscosity equal to 17 and melting point=187° C.–190° C., are introduced into the mixer described in the Example 1, together with 3 parts of 2-methyl-2-propyl-1,3-propandiol and 0.5 parts of oleic amide and the homogenization is started.

22 parts of a mixture formed by 35% of 3-methyl-1,3,5-pentatriol, 25% of diethyleneglycol, 9% of tributanolamine, 12% of glycerol and 7% of decahydrated megnesium chloride are added in the mixer protracting the homogenization till reaching an inner mixer temperature equal to 100° C.

23 parts of a mixture (formerly prepared in the mixer) formed by 80% of mannitol, 6.5% of 3-methyl-1,3,5-propandiol, 1% of tributanolamine, 0.5% of acetylsalicylic acid, 0.5% of Irganox® B 225, 0.3% of synthetic hydrotalcite, 0.2% of heptahydrated aluminum trihydroxide and, finally, 11% of polyisobutene having molecular weight equal to 50,000, are added without interrupting the homogenization.

The so obtained composition is fed in a single-screw extruder (screw Diameter=50 mm, L/D=30) equipped with a head for the three layers coextrusion and equipped with suitable moulds for the production of hollow manufactures by blow.

The extruder temperature ranges from 200° C. of the feeding zone to 215° C. of the compression zone and it is equal to 210° C. in the filming head.

The obtained manufactures (cylindrical containers) contain the PVOH as the intermediate layer of a sandwich-type structure wherein the external layers are formed by PE.

The operative conditions are regulated in order to obtain a three layers manufacture with each single layer having a thickness equal to 100 micrometers.

The manufacture is homogeneous and, submitted to the suitable tests, shows a permeability to the main gases much lower than manufactures having similar thickness, formed by PE.

EXAMPLE 6

The thermoplastic PVOH based compositions, obtained by the formulations and the methods shown in the Examples 1, 2, 3, 4 and 5 are fed in a single-screw extruder (Diameter= 50 mm, L/D=25) equipped with a filtering pack with 2200 meshes/cm² and with a head comprising a spinner with holes having a diameter equal to 2.5 mm for the production of plastic spaghetti which are, after cooling in air, transformed in little cylinders by a cutter.

The temperatures in the feeding zone, in the compression zone, in the metering zone and in the extrusion head are respectively equal to 200° C., 215° C., 205° C. and 190° C.

The different lots of pelletized material may be immediately or in following times used for the production of flat or tubular films, manufactures obtained by injection molding, extruded pipes, coextruded manufactures and so on according to the techniques used for the most common plastic materials, obtaining results similar to ones obtained directly using the PVOH compositions powder shaped.

EXAMPLE 7

Into the turbomixer whose capacity is 500 l, provided with rotation speed equal to about 700 rpm, 100 parts of PVOH (having viscosity of 18 cps, hydrolysis grade 88% and melting point 186° C.) are fed together with two parts of trimethylolpropane and 0.2 parts of polyethylenglycol with PM=6000.

The mixer is started and is supplied with 10 parts of a prepared mixture formed by 32% of ethylenglycol, 12% of glycerol, 8% of diethanolamine, 6% of diethylenglycol, 6% of LiCl and 22% of water, allowing mixing to proceed till an inside temperature of about 100° C. is reached.

The operation is finally completed by adding into the turbomixer 20 parts of a pre-prepared mixture composed of 85% of pentaerythritol, 3% of sodium zeolite, 3% of aluminium hydroxide heptahydrate, 1% of a copolymer ethylene-vinylacetate, 0.5% of boric acid, 0.5% of Irganox® B 225, 1% of diethanolamine and finally 6% of diethylenglycol, homogeneizing for other 30 seconds.

The thus-obtained PVOH thermoplastic composition, whose appearance is a coarse, dry, white-coloured powder, is immediately fed through the loading hopper, to a single-screw extruder with screw whose diameter is 50 mm with L/D ratio=30, equipped with a filming lip adapted to produce a plan film whose thickness is about 30 microns. Process temperatures detected on the filming machine in the different areas are:

| | |
|---|---|
| feeding area | 205° C. |
| compression area | 215° C. |
| metering area | 200° C. |
| head | 180° C. |

The film has been subjected to test to determine some mechanical features at 22° C. with relative humidity between 70 and 85%.

The results are included in the following Table

| | | RELATIVE HUMIDITY | |
|---|---|---|---|
| | | 70% | 85% |
| 10%-elongation E secant module | N/mm$^2$ | 80 | 13 |
| Load supported for 24 hours at 30% elongation (CSI) | N/mm$^2$ | 8.5 | 7 |

Traction is longitudinally applied. Should it be applied transversally, with the same load, double distortions would be obtained.

EXAMPLE 8

Into the 500-l turbomixer, whose rotation speed is equal to about 700 rpm, 100 parts of PVOH are inserted whose viscosity is equal to 26 cps, hydrolisis grade 88% and melting point 188° C., together with three parts of neopentylglycol and 0.3 parts of polyethylenglycol with PM=5000.

The mixer is started and is supplied with 7.5 parts of a mixture prepared apart and formed by 20% of propylenglycol, 16% of glycerol, 16% of triethanolamine, 26% of dipropylenglycol, 6% of LiCl and finally 16% of water, allowing mixing to proceed till an inside temperature of about 110° C. is reached.

Finally 23 parts are added of a previously prepared, homogeneous mixture composed of 88% of pentaerythritol, 2% of synthetic dihydrocalcite, 2% of low-density polyvinylacetate, 0.4% of boric acid, % 0.6% of Irganox® B 225, 1.5% of triethanolamine and 5.5% of dipropylenglycol, completing this filler with 1 part of anhydrous silica and homogeneizing for about 20 seconds.

The thus-obtained PVOH-based thermoplastic material, whose appearance is a granular, dry, white-coloured powder, is inserted into an extruder (screw diameter 50 mm, L/D=30) equipped with granulating head and completed with an air-cooling system and a cutter. Extrusion conditions being verified are similar to those included in the previous Example (Ex. 7).

The granulated material has been fed into a filiming machine to produce a tubular film whose thickness is 25 microns, with temperatures in the different areas of the apparatus corresponding to:

| | |
|---|---|
| feeding area | 208° C. |
| compression area | 220° C. |
| metering area | 200° C. |
| head | 185° C. |

Mechanical features, in terms of secant module and load supported at 30% elongation, measured under the same conditions as in the previous Example, were found equivalent.

EXAMPLE 9

In the previously described turbomixer, 100 part of PVOH are supplied whose viscosity is 28 cps, hydrolisis grade 99% and melting point of about 195° C., together with 2.5 parts of neopentylglycol, 0.2 parts of polyethylenglycol with PM=10,000 and 0.1 parts of erucamide.

The turbomixer is started and 15 parts of a mixture are added, such mixture being prepared apart and being composed of 26% of propylenglycol, 12% of triethanolamine, 36% of dipropylenglycol, 6% of NaCl, 6% of magnesium chloride hexahydrate and finally 14% of water, allowing mixing to proceed till an inside temperature of about 115° C. is reached.

Now, 25 parts of a prepared mixture composed of 90% of pentaerythritol, 2% of aluminium trihydroxide eptahydrate, 1% of sodic zeolite, 0.5% of Irganox® B 225, 0.4% of boric acid, 0.4% of salicilic acid, 1% of triethanolamine and finally 4.7% of diethylenglycol, completing by adding 1 part of anhydrous silica and homogeneizing for about 30 seconds.

The thus-obtained thermoplastic composition is fed into the hopper of a single-screw extruder (screw diameter about 50 mm, L/D=30) with temperatures into feeding, compression, metering areas and head being respectively of 215°, 225°, 210° and 180°, with the head being equipped with a filming lip adapted to produce a plan film whose thickness is 30 microns.

The film is subjected to a series of tests to determine the main mechanical features. The results of the tests carried out at temperatures between +20° and +40° C., with relative humidity varying between 40 and 80%, are included in the following table:

| | | RELATIVE HUMIDITY | |
|---|---|---|---|
| | | 40% | 80% |
| Ultimate (rupture) tensile stress (ISO 527 at 50 mm/min) | N/mm$^2$ | 30 | 85 |
| Ultimate (rupture) elongation (ISO 527) | % | 120 | 320 |
| 10%-elongation E secant module (E10) (ISO 527) | N/mm$^2$ | 35 | 150 |

What is claimed is:

1. A three stages process for the preparation of moldable and extrudable polyvinyl alcohol-based solid thermoplastic compositions characterized in that a mixer is fed with the following charges in succession:
    a) a solid charge comprising the polyvinyl alcohol (PVOH) and from 1 to 10 parts by weight of one or more solid plasticizers per 100 parts of PVOH;
    b) a charge consisting of between 5 and 30 parts by weight with respect to 100 parts of PVOH of the charge a), of a liquid mixture containing one or more hydroxylated organic compounds, water and at least a salt of an alkaline and/or alkaline earth metal, bringing the temperature of the mixture to a value ranging from 90° C. to 125° C.;
    c) a charge consisting of between 15 and 30 parts by weight with respect to 100 parts of PVOH of the charge a), of a solid mixture containing solid polyhydroxylated alcohols, glycols and glycolic ethers, liquid alkanolamines, mineral or organic acids, a compound selected from the group consisting of hydrated inorganic salts and aluminum trihydroxide heptahydrate, stabilizers, optionally other compatible polymers and/or copolymers having low molecular weight, optionally mineral charges, and mixing for a period of time ranging from 10 to 60 seconds before unloading the composition in the form of a solid granular powder, which is subsequently cooled.

2. A three stages process as claimed in claim 1, wherein said solid plasticizers of the charge a) are glycols, polyethyleneglycols and aliphatic amides.

3. A three stages process as claimed in claim 2, wherein said solid plasticizers of the charge a) are neopentyl glycol, 2-methyl-2-propyl-1,3-propandiol; trimethylolpropane; polyethyleneglycol (MW 1,000–10,000); glycerol monostearate; erucic amide, oleic amide, palmitic amide.

4. A three stages process as claimed in claim 1, wherein in that said hydroxylated compounds of the charge b) are glycols, glycolic ethers and alkanolamines.

5. A three stages process as claimed in claim 4, wherein in that said hydroxylated compounds of the charge b) are glycerol (anhydrous or hydrated), ethyleneglycol, propyleneglycols, diethyleneglycol, dipropyleneglycol, trimethyleneglycol, triethyleneglycol, tetraethyleneglycol, 1,2 hexanediol, 1,2,3-hexanetriol, 1,2,6-hexanetriol, 3-methyl-1,3,5-pentatriol, diethanolamine, triethanolamine and tributanolamine.

6. A three stages process as claimed in claim 1, wherein in that said salts of alkaline or alkaline earth metals of the charge b) are lithium chloride, sodium chloride, potassium chloride, calcium chloride and magnesium chloride.

7. A three stages process as claimed in claim 1, wherein in that the charge b) and the charge c) are previously prepared by mixing of their components before putting them into said mixer.

8. A three stages process as claimed in claim 7, wherein in that the solid polyhydroxylated alcohols used in the charge c) are pentaerythritol; mannitol; trimethylolethane; inositol.

9. A three stages process as claimed in claim 7, wherein in that the inorganic and organic acids used in the charge c) are one more among boric acid; stannic acid; adipic acid; citric acid; salicylic acid; acetylsalicylic acid; ascorbic acid.

10. A solid thermoplastic polyvinyl alcohol-based, moldable and extrudable composition obtained by feeding to a mixer a charge a) consisting of 100 parts of PVOH, 1–10 parts of one or more solid glycols, 5–30 parts by weight (with respect to 100 parts of PVOH contained in the charge a)) of a charge b) consisting of 30–70% of a liquid glycol and/or of a glycolic ether, 10–25% of water, 5–20% of an alkanolamine, up to 20% of a trihydroxylated alcohol and 5–15% of a salt of an alkaline or alkaline earth metal, and from 15 to 30 parts by weight (with respect to 100 parts of PVOH contained in the charge a)) of a charge c) consisting of a solid mixture containing 85–95% of solid polyhydroxylated aliphatic alcohol, 4–10% of a liquid glycol or glycolic ether, 0.5–2% of an alkanolamine, 0.3–2.0% of an inorganic or organic acid, 0.1–7% of an hydrated inorganic salt, 0.2–0.7% of a stabilizer, up to 1.5 parts of a mineral charge and up to 4% of a polymer or copolymer having low molecular weight.

11. A three stages process for the preparation of moldable and extrudable polyvinyl alcohol-based solid thermoplastic compositions, said process consisting of the feeding to a mixer the following charges in succession:

a) a solid charge comprising the polyvinyl alcohol (PVOH) and from 1 to 10 parts by weight of one or more solid plasticizers per 100 parts of PVOH;

b) a charge consisting of between 5 and 30 parts by weight with respect to 100 parts of PVOH of the charge a), of a liquid mixture containing one or more hydroxylated organic compounds, water and at least a salt of an alkaline and/or alkaline earth metal, bringing the temperature of the mixture to a value ranging from 90° C. to 125° C.;

c) a charge consisting of between 15 and 30 parts by weight with respect to 100 parts of PVOH of the charge a), of a solid mixture containing solid polyhydroxylated alcohols, glycols and glycolic ethers, liquid alkanolamines, mineral or organic acids, a compound selected from hydrated inorganic salts and aluminum trioxide heptahydrate, stabilizers, optionally compatible polymers and/or copolymers having low molecular weight, optionally mineral charges, and mixing for a period of time ranging from 10 to 60 seconds before unloading the composition in the form of a solid granular powder, which is subsequently cooled.

* * * * *